US005621296A

United States Patent [19]
Werner et al.

[11] Patent Number: 5,621,296
[45] Date of Patent: Apr. 15, 1997

[54] THREE PHASE MOTOR CONVERSION AND MONITORING CIRCUIT

[76] Inventors: Gary A. Werner, 201 N. Commercial, Harrisonville, Mo. 64078; Thomas F. Lehman, 208 SW. Rogers Dr., Lee's Summit, Mo. 64081

[21] Appl. No.: 512,023

[22] Filed: Aug. 7, 1995

[51] Int. Cl.$^6$ .................................................. H02P 5/28
[52] U.S. Cl. ........................ 318/768; 318/807; 318/799
[58] Field of Search ............................... 318/700–823; 363/148, 150; 361/31, 23

[56] References Cited

U.S. PATENT DOCUMENTS

| | | | |
|---|---|---|---|
| 3,258,668 | 6/1966 | Milligan | 318/749 |
| 3,271,646 | 9/1966 | Lewus | 318/768 |
| 3,566,226 | 2/1971 | Tamm | 318/768 |
| 3,673,480 | 6/1972 | Johnstone | 318/768 |
| 3,761,792 | 9/1973 | Whitney et al. | |
| 3,835,356 | 9/1974 | Soderholm | 318/768 |
| 4,333,119 | 6/1982 | Schoenmeyr | 361/76 |
| 4,484,125 | 11/1984 | Hertz | 318/768 |
| 4,642,545 | 2/1987 | Lewus | 318/749 |
| 4,651,077 | 3/1987 | Woyski | |
| 4,683,413 | 7/1987 | Bax | 318/779 |
| 4,724,503 | 2/1988 | Libert | 318/806 |
| 4,777,421 | 10/1988 | West | 318/768 |
| 4,796,142 | 1/1989 | Libert | 361/23 |
| 4,808,868 | 2/1989 | Roberts | 318/817 |
| 5,017,853 | 5/1991 | Chmiel | |
| 5,051,681 | 9/1991 | Schwarz | 318/786 |
| 5,247,236 | 9/1993 | Schroeder | 318/794 |
| 5,300,870 | 4/1994 | Smith | 318/768 |
| 5,300,871 | 4/1994 | Bucher et al. | 318/794 |
| 5,300,879 | 4/1994 | Masuda et al. | |
| 5,325,034 | 6/1994 | Reynolds | 318/782 |
| 5,359,273 | 10/1994 | Fluckiger | 318/794 |
| 5,404,088 | 4/1995 | Nanos | 318/751 |
| 5,436,546 | 7/1995 | Trumpler et al. | 318/773 |
| 5,473,241 | 12/1995 | Chen et al. | 318/807 |
| 5,514,943 | 5/1996 | Shapes | 318/772 |
| 5,528,120 | 6/1996 | Brodetsky | 318/785 |

*Primary Examiner*—Paul Ip
*Attorney, Agent, or Firm*—Litman, McMahon and Brown, L.L.C.

[57] ABSTRACT

A three phase motor conversion and monitoring circuit converts a three phase motor to be started and run on single phase line power. During motor start-up, the circuit connects a start capacitor across a first input pair of the motor via a normally closed relay contact. The circuit includes a power supply connected across a first motor input pair which powers both a voltage monitor connected across a different input pair and a phase sequencing detector. When normal run voltage is detected across the first and second input pairs, and if and only if the phase sequencing detector has detected a normal phase sequence indicating that the motor is rotating in the correct direction, the relay is operated to open the normally closed contacts and to remove the start capacitor from the motor circuit.

23 Claims, 3 Drawing Sheets

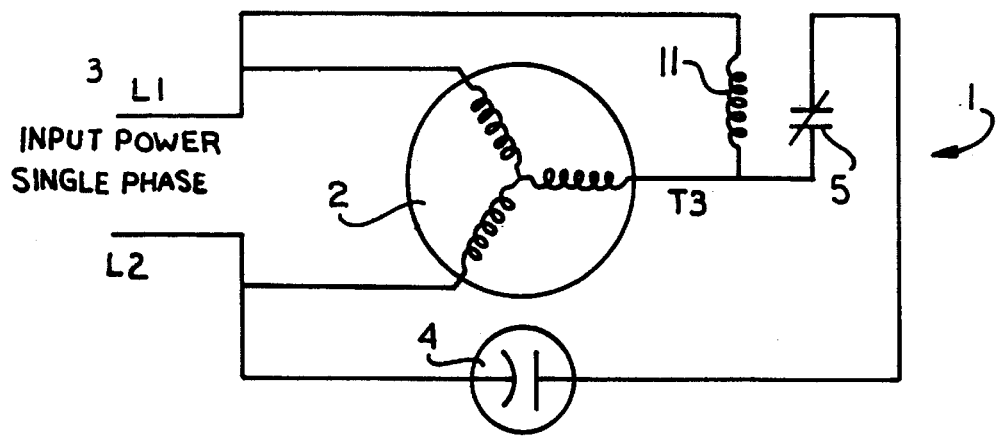
Fig.1. (PRIOR ART)
Fig.2.
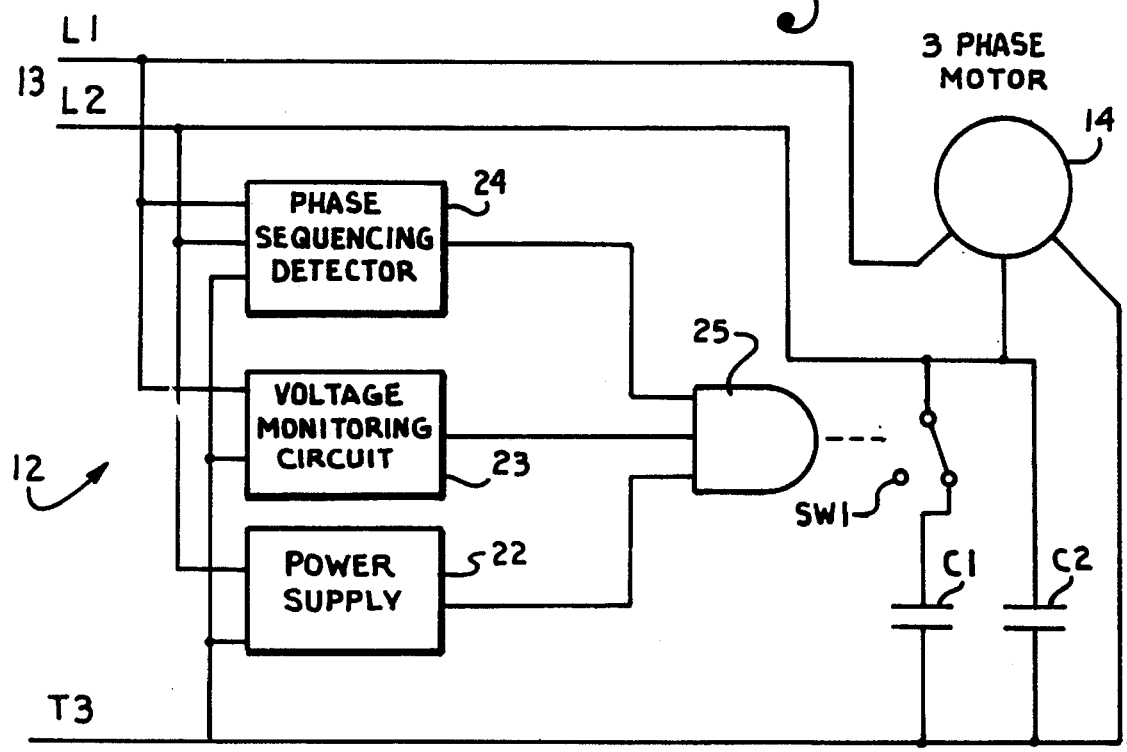

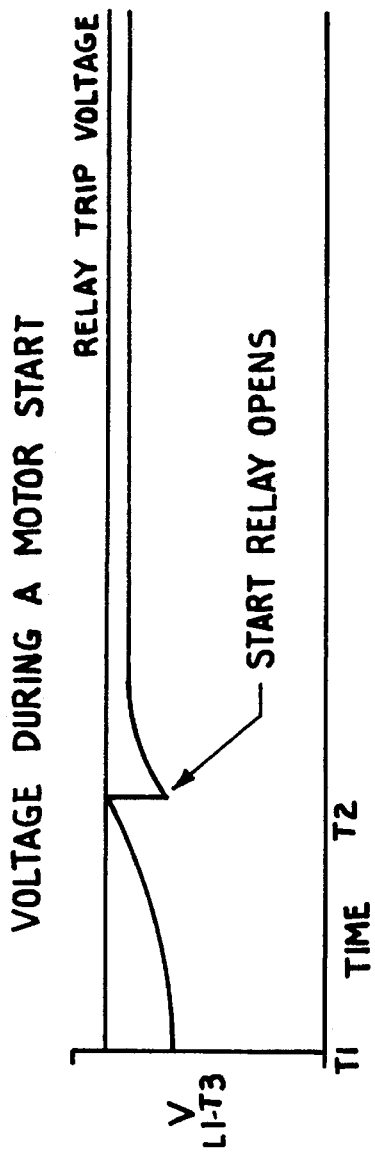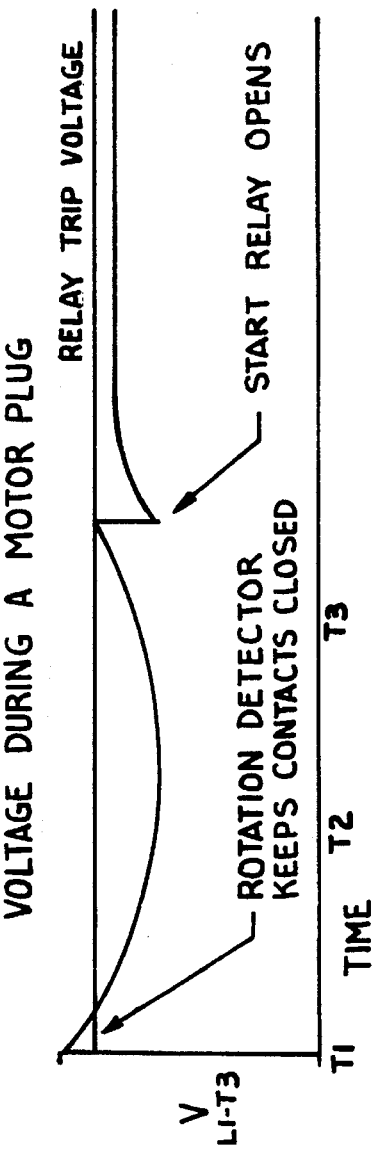

THREE PHASE MOTOR CONVERSION AND MONITORING CIRCUIT

BACKGROUND OF THE INVENTION

1. Field of the Invention

This invention is directed to a three phase motor conversion and monitoring circuit, and more particularly to a monitoring and conversion circuit for converting a three phase AC electrical motor to run on single phase power. The inventive circuit switches a starting capacitor across two inputs of the three phase motor via a normally closed relay contact. The circuit includes a power supply connected between a first pair of motor inputs which powers a voltage sensor connected between a different pair of motor inputs and a phase sequencing detector, all of which must sense normal motor operating conditions prior to switching the starting capacitor out of the motor circuit.

2. Description of the Related Art

It is well known that three phase electrical motors can be operated via single phase line power if the motor has one input connected to each of the line leads and a third input connected to a floating reference point which typically stabilizes at a voltage approximately between the two line leads. During periods of start-up, when large currents are needed to drive the motor, a starting capacitor is temporarily connected from one of the line leads to the floating lead via a normally closed contact until the motor is brought up to normal running speed. This has the effect of providing a large current to the floating lead during start-up, thus greatly increasing motor torque. Typically such starting capacitors are connected via a single phase relay or timing device which monitors the voltage between one of the line leads and the floating lead to sense a voltage which indicates normal motor running speed and then opens the normally closed contact.

A number of problems occur with this typical prior art approach. The monitoring of the voltage across two of the motor inputs may work well for one motor design and not for another motor design, even of identical horsepower. This is due to the fact that differing motor designs have different internal resistances. In motors with higher internal resistances, initial voltages across the monitored inputs can jump to a value greater than needed to trip the monitoring relay, thus prematurely tripping of the relay, resulting in premature trip out of the starting capacitor. Furthermore, the use of a run capacitor in parallel with the start capacitor can cause the monitored voltage to remain high for several seconds even after motor shut down, thus not allowing the start capacitor to be reinserted in the circuit until the run capacitor's voltage was bled off. Also, the run capacitor can cause relay chatter since voltage across the relay can oscillate back and forth around the critical voltage. In addition, the monitoring of a single voltage value means that, when a monitored motor is "plugged" (instantly reversed under load), the motor will still generate a voltage across the monitored branch which is sufficient to maintain the relay contact open. This is an undesirable condition, since a plugged motor needs to be reversed and, if the starting capacitor does not become reconnected, the motor direction cannot be reversed. The lack of hysterisis in the monitoring relays of prior art circuits effectively limited the voltage operating range of such circuits without modification. Often, in prior art circuits, voltage spikes across the monitored motor inputs occurring during motor start-up would cause instantaneous trip-out of the monitoring relay and thus premature drop-out of the starting capacitor. Finally, in prior art circuits, the value of starting capacitors was limited to approximately 100 µFD per motor horsepower before reaching a level at which false tripping of the relay would occur. Some applications, such as high speed lathes driven by relatively low horsepower motors, need larger starting capacitors than this.

It is clear then, that an improved starting and monitoring circuit is needed for converting three phase electrical motors to run on single phase power. Such a circuit should be universally applicable to virtually all three phase motor designs and should monitor multiple voltages and phase sequences such that normal motor operation is assured prior to drop out of the starting capacitor. Such a circuit should allow use of starting capacitors up to 200 µFD per horsepower without false tripping of the switch and should eliminate relay chatter, even when a run capacitor is used.

SUMMARY OF THE INVENTION

In the practice of the present invention, a three phase potential relay circuit is designed for convening a three phase electric motor to run on a single phase power source. For purposes of discussion, the motor inputs are labeled as "L1", "L2", and "T3", with L1 and L2 representing single phase line terminals and T3 representing a floating reference lead. The inventive circuit measures the voltage across L1–T3 with a voltage monitoring circuit. The voltage monitoring circuit controls a relay with normally closed contacts which connect a start capacitor across L2–T3. The voltage monitoring circuit is powered by a power supply connected across L2–T3. Thus, if insufficient voltage appears between L2–T3, no power is supplied to the voltage monitoring circuit and the normally closed contacts are maintained closed. Once the L2–T3 voltage reaches the level at which the voltage monitoring circuit becomes active, it monitors L1–T3 voltage until it reaches a value which equates to normal operating speed for the motor. Then the relay is activated and the normally closed contacts opened, thus dropping the starting capacitor out of the circuit. In addition, the circuit includes a phase sequencing detector, also powered by the power supply connected across L2–T3 which monitors the phase voltage sequencing of the motor. If the motor is plugged (switched to reverse directions), the phase detector senses a reversed sequence of phase voltages. In response, the phase detector deactivates the voltage comparison circuit, thus preventing operation of the relay and causing the starting capacitor to remain connected across the motor in an effort to reverse the motor. The inventive circuit connects entirely on the line side of the motor, thus eliminating any user modification of motor controls. By adding hysterisis in the relay circuit and monitoring the interaction between all three motor phase voltages, the inventive circuit will operate, without modification, on a wide variety of L1–L2 voltages. Filters for the phase detector and the voltage detector create an approximately 5 cycle delay to prevent premature trip-out of the relay and consequent drop-out of the start capacitor. This feature allows the inventive circuit to use greater than normal starting capacitance, e.g. on the order of 200 µFD per horsepower, without causing premature capacitor drop-out.

OBJECTS AND ADVANTAGES OF THE INVENTION

The principle objects and advantages of the present invention include: to provide an improved three phase motor monitoring and conversion circuit; to provide such a circuit which allows a three phase motor to be started and run from a single phase power source; to provide such a circuit which connects a start capacitor across two of the motor inputs during start-up of the motor; to provide such a circuit which monitors multiple motor voltages and disconnects the start capacitor when the motor reaches a normal running speed; to provide such a circuit which includes a phase sequencing detector which monitors sequencing of voltages across the motor inputs and which deactivates the voltage monitoring circuit when a plugged (reversed) motor is sensed; to provide such a circuit which connects at the line side of the motor, thus eliminating any user modification of motor controls; to provide such a circuit which allows the use of a run capacitor while still allowing instant restart of the motor; to provide such a circuit with relay hysterisis which allows a broad voltage operating range without any circuit modification; to provide such a circuit with filters for the phase sequence detector and the voltage monitor which allow an approximate five cycle delay to prevent relay trip-out due to voltage spikes during start-up; and to provide such a circuit which is reliable, durable, economical to manufacture, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a circuit diagram of a prior art circuit for operating a three phase motor from single phase power.

FIG. 2 is a logical circuit diagram of a three phase motor conversion and monitoring circuit in accordance with the present invention for starting and operating a three phase motor via single phase power.

FIG. 4 is a timing diagram of the voltage across two inputs of the motor of FIG. 3 during a normal motor start sequence.

FIG. 5 is a timing diagram of the voltage across two inputs of the motor of FIG. 3 during a motor plug sequence.

DETAILED DESCRIPTION OF THE INVENTION

I. Introduction and Environment

Figure 3:
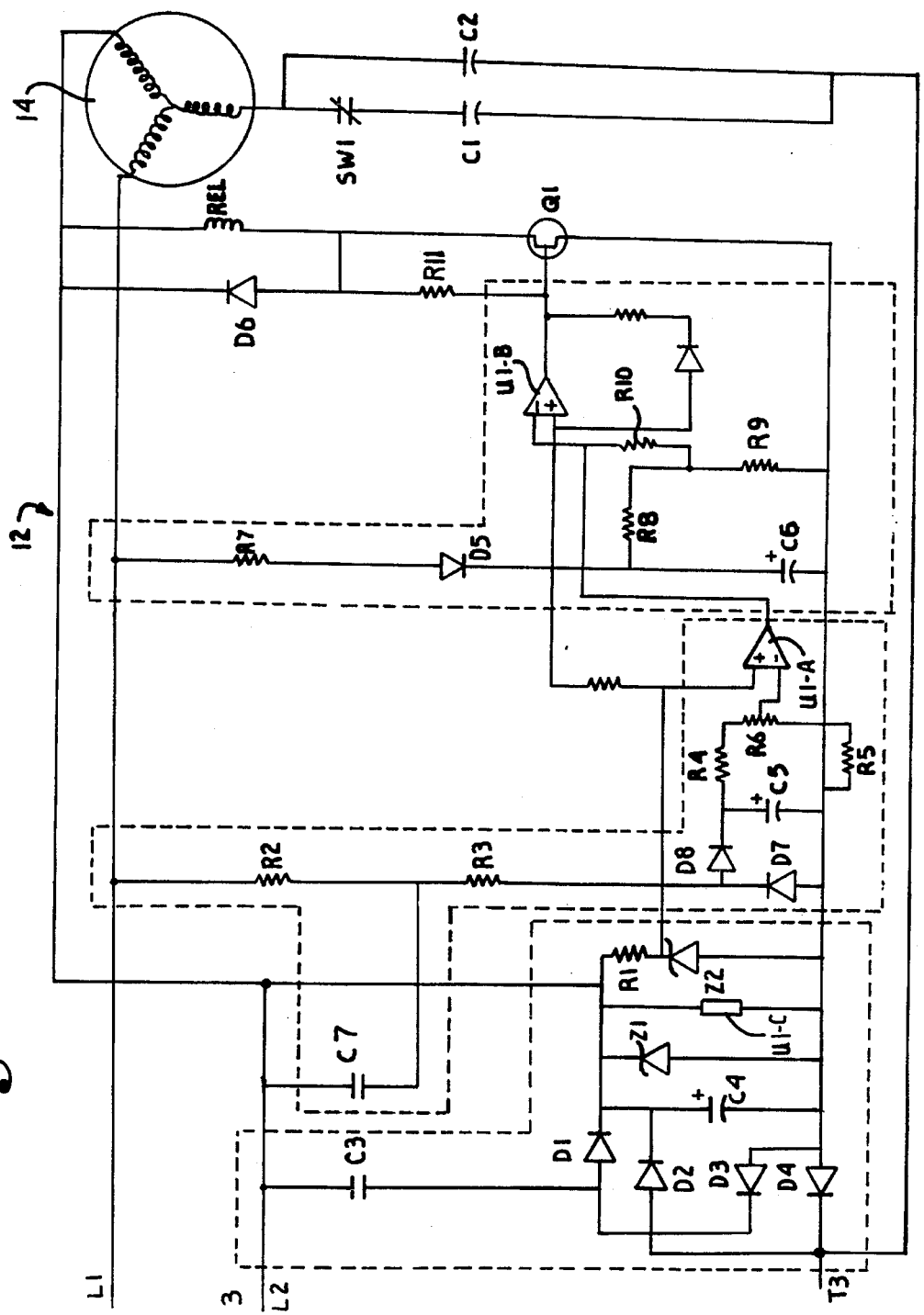
FIG. 3 is a detailed circuit diagram of a preferred embodiment of the inventive three phase motor monitoring and conversion circuit.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Prior Art Starting Circuit

Referring to the drawings in more detail, FIG. 1 illustrates a simplified prior art conversion circuit, generally indicated as 1, for running a three phase AC electric motor 2 via a single phase power supply 3. The circuit 1 includes a start capacitor 4 which is connected across inputs L2 and T3 of the motor 2 via a normally closed relay contact 5. A voltage monitoring relay winding 11 is connected across inputs L 1 and T3. In winding 11, and the normally closed relay contact 5 is closed. As power is supplied to the motor 2, a phase-shifted AC voltage is formed across inputs L2 and T3 via the starting capacitor 4. As the motor 2 reaches normal operating speed, the 3 phase voltages L1–T3 and L2–T3 increase. The reaction produced by the capacitor 4 and the inductance of the motor (counter EMF) raises the L1–T3 voltage to a point at which coil 11 pulls in its armature, breaking the normally closed relay contact 5, removing the starting capacitor 4 from the circuit.

III. Three Phase Motor Starting and Monitoring Circuit

Referring to FIG. 2, a three phase starting and monitoring circuit 12 according to the present invention is illustrated in logical block form. The circuit 12 is connected between a single phase power source 13 and a three phase motor 14 and includes a start capacitor C1 which is connected across inputs T3 and L2 via a normally closed relay switch SW1. A power supply, indicated as block 22, is connected between inputs L2 and T3 to power a voltage monitoring circuit, indicated as block 23 and connected between inputs L1 and T3 and a phase sequencing detector circuit, indicated as block 24 and connected between L1, L2 and T3. In practice, the three circuits are essentially logically ANDed, as logically represented by AND gate 25 to control the normally closed switch SW1 to disconnect the start capacitor C1 from across the inputs L2 and T3. In other words, first sufficient voltage must be present between inputs L2 and T3 to cause the power supply 22 to power the voltage monitoring circuit 23. Next the voltage monitoring circuit 23 must detect sufficient voltage between the inputs L1 and T3 to correspond to a normal running speed for the motor 14. Finally the phase sequencing detector 24 must detect the proper phase voltages at the proper sequence to indicate the correct motor direction. If, and only if, all of these conditions are met, the normally closed switch SW1 is opened to remove the start capacitor C1 from across the inputs L2–T3. A small run capacitor C2 is shown permanently connected across the inputs L2 and T3 as well.

FIG. 3 illustrates a schematic diagram of a preferred embodiment of the three phase conversion and monitoring circuit 12 represented logically in FIG. 2. In FIG. 3, the three phase motor 14 is connected to L1, L2 and T3. L1 and L2 are normal single phase line 240 volt line terminals and T3 is a floating terminal which, when the motor 14 is connected, normally assumes a voltage approximately half way between L1 and L2. The start capacitor C1 is connected across inputs L2 and T3 via the normally closed relay contacts SW1 of relay REL. The optional run capacitor C2 is connected in parallel with the series connection of the switch SW1 and starting capacitor C1.

The capacitor driven power supply 22 includes a capacitor C3 and a rectifying diode bridge D1–D4. A DC voltage is thus supplied to a parallel connection of a capacitor C4 and a zener diode Z1. The zener diode Z1 limits the voltage across a comparator power connection U1-C to approximately 24 volts. A voltage divider including a zener diode Z2 connected to a resistor R1 provides a reference voltage for first and second comparator circuits U1-A and U1-B, to be described below. The reference voltage at the intersection of the resistor R1 and zener diode Z2 is approximately 6 volts, for example.

The phase sequencing detector 24 is connected between inputs L1, L2 and T3 and includes a voltage divider circuit with resistors R2, R3 and capacitor C7 connected to a pair of rectifying diodes D7 and D8 which supply a DC voltage to a filter capacitor C5 connected between the cathode of the diode D8 and T3 and a three leg voltage divider including resistors R4, R5 and rheostat R6 connected across the capacitor C5. The capacitor C5 and the resistors R4, R5 and R6 perform a filtering function to prevent voltage spikes during start-up of the motor 14 from triggering the first comparator circuit U1-A. The first comparator circuit U-1A has its inverting input connected to the wiper arm of the rheostat R6 and has its non-inverting input connected to the reference voltage of the zener diode Z2. The first comparator U1-A has open collector output transistors connected to the inverting input of the second comparator U1-B such that, with a low output from U1-A, the output of U1-B is driven high, switching off a transistor Q1 and preventing current from reaching the relay coil REL. The switch SW1 is controlled by the relay coil REL. If the three phase motor 14 is driven backwards. The phase relation of C7, R2 and R3 causes a larger current to flow through R3 connected between inputs L1 and T3. The diode pair D7 and D8 rectify the AC current, which flows through the resistive voltage divider R4, R5, R6. The wiper arm of the rheostat R6 thus assumes a voltage representative of the magnitude of current flowing through R3. Should this voltage exceed the nominal reference 6 volts, as it does in the case of a plugged (reversed) motor, the comparator output of U1-A goes low, driving the output of the second comparator U1-B high and effectively disabling any other comparison by the comparator U1-B. By contrast, if the motor rotation is correct, the voltage at the wiper of R6 is lower than the reference voltage, and the comparator U1-A drops out.

The voltage monitoring circuit 23 is connected between the inputs L1 and T3 and includes a voltage divider formed by resistors R7, R8 and R9 and capacitor C6. The voltage divider senses the voltage between L1 and T3 and supplies a representative voltage value to the inverting input of comparator U1-B via a resistor R10. Again, the capacitor C5 and the resistors R8 and R9 perform a filtering function to prevent voltage spikes during start-up of the motor 14 from prematurely triggering the second comparator circuit U1-B. As the input to the second comparator U1-B goes high, the output of U1-B is driven low, switching Q1 on and providing an operating current to the relay coil REL. Thus, the voltage monitoring circuit 23 senses a relatively high voltage between L1 and T3, a condition indicative of too much capacitance across L2 and T3, typically occurring as the motor 14 approaches normal operating speed. In response, the circuit 23 causes the relay coil REL to open the normally closed contacts SW1.

A resistor R11 is connected to a feedback diode D6 which is connected in parallel across the relay REL to provide a hysterisis effect for the relay REL. With the hysteresis effect provided by the diode D6 and the resistor R11, the relay REL will trip-out, i.e open the contacts SW1, at a voltage approximately twice that at which the relay REL will drop out, i.e. close the contacts SW1. This insures that the circuit 12 will reliably operate in a wide voltage range without any modification, e.g. a range on the order of 160–260 volts AC.

Referring to FIG. 4, a graph of voltage across L1–T3 vs. time is illustrated for a normal motor start. As power is applied to the motor 14 at time T1, voltage L1–T3 begins to rise as the motor approaches normal operating speed. At time T2 the voltage across L1–T3 reaches a level indicative of too much capacitance in the motor circuit, indicated by the relay trip voltage reference value. At this point, the voltage monitoring circuit 23 trips the relay REL, thus opening the normally closed contacts SW1 to thereby drop out the start capacitor C1. Thereafter, the voltage across L1–T3 drops precipitously but quickly recovers to a normal run value where it remains as long as the motor 14 continues to run.

Referring to FIG. 5, a graph of voltage across L1–T3 is illustrated for a condition in which the motor 14 is plugged, or running in reverse. At time T1, although the voltage across L1–T3 is higher than the reference relay trip voltage which would normally cause the monitoring circuit 23 to trip the relay REL, the phase sequencing detector 24 prevents the second comparator U1-B from going low, thus maintaining the start capacitor C1 across the motor inputs L2–T3. As the start capacitor C1 remains in the motor circuit, it tends to provide a relatively large current to input T3 with the effect of reversing the rotation of the motor 14. As the motor 14 starts running in the correct direction, at time T2, the voltage across L114 T3 first drops down to a normal range, and then, at time T3, it reaches the relay trip voltage level. At this point, the phase sequencing detector 24 has detected a proper phase sequence and dropped the first comparator U1-A out, thus allowing the voltage monitoring circuit 23 to function normally, switching the transistor Q1 on to cause the relay REL to open the contacts SW1 and drop the start capacitor C1 from the motor circuit as the L1–T3 voltage again reaches the trip voltage value.

It should be noted that the inventive circuit can be readily modified to work for any voltage by changing the values of components including the capacitor C3 and the zener diode Z1.

It is to be understood that while certain forms of the present invention, including dimensions and materials, have been illustrated and described herein, it is not to be limited to the specific forms or arrangement of parts described and shown.

What is claimed and desired to be secured by Letters Patent is as follows:

1. A three phase motor conversion and monitoring circuit for converting a three phase motor to operate from a single phase power source, two inputs of said motor being connected to individual power line leads L1 and L2 and a third motor input being connected to a floating reference lead T3, said circuit comprising:

a. a start capacitor;

b. a normally closed switch selectively connecting said start capacitor across two inputs of said motor;

c. monitoring means for monitoring phase voltages across said motor inputs and a phase voltage sequencing of voltages across the motor inputs to detect phase voltages and phase sequencing which collectively indicate normal motor operating conditions and correct motor direction, said monitoring means causing said normally closed switch to open when it detects said normal motor operating conditions and correct motor direction.

2. A circuit as in claim 1, said monitoring means comprising:

a. voltage monitoring circuit means connected between either L1 or L2 and T3 for monitoring a voltage across two inputs of said motor;

b. power supply means connected between T3 and the other of L1 and L2 for supplying power to said voltage monitoring circuit means; and c. control means responsive to said voltage monitoring circuit means for controlling said switch means to disconnect said start capacitor when said voltage monitoring circuit means detects a voltage indicative of normal motor operating speed.

3. A circuit as in claim 2, said monitoring circuit further comprising:
   a. phase sequencing detector means for detecting a correct sequence of phase voltages between each of said three inputs to determine that said motor is running in the correct direction, said phase sequencing detector disabling said control means in the event said correct sequence is not detected.

4. A circuit as in claim 3, wherein said phase sequencing detector means comprises:
   a. a voltage divider extending between T3 and L1 or L2; and
   b. comparator means for comparing a voltage across a portion of said voltage divider with a reference voltage, said comparator means disabling said voltage monitoring circuit means when said voltage divider voltage is greater than said reference voltage.

5. A circuit as in claim 4, wherein said phase sequencing detector means further comprises:
   a. a filter for filtering out voltage spikes which occur during motor start-up such that such spikes do not prematurely cause said comparator to disable said voltage monitoring circuit.

6. A circuit as in claim 2, wherein said voltage monitoring circuit means comprises:
   a. a voltage divider extending between T3 and L1 or L2; and
   b. a comparator which compares a voltage across a portion of said voltage divider with a reference voltage, said comparator opening said normally closed switch to thereby disconnect said starting capacitor from across said two motor inputs when said voltage divider voltage is greater than said reference voltage.

7. A circuit as in claim 6, wherein said voltage monitoring circuit means further comprises:
   a. a filter for filtering out voltage spikes which occur during motor start-up such that such spikes do not prematurely cause said comparator to open said normally closed switch in response to such voltage spikes.

8. A circuit as in claim 2, said normally closed switch comprising a relay coil with a normally closed relay contact, said circuit further comprising:
   a. a feedback loop connected across said relay coil to generate a hysterisis effect in said relay such that the effective voltage operating range of said circuit is enhanced.

9. A three phase motor conversion and monitoring circuit for converting a three phase motor to operate from a single phase power source, two inputs of said motor being connected to individual power line leads L1 and L2 and a third motor input being connected to a floating reference lead T3, said circuit comprising:
   a. a start capacitor;
   b. a normally closed switch selectively connecting said start capacitor across two inputs of said motor;
   c. voltage monitoring circuit means connected between either L1 or L2 and T3 for monitoring a voltage across two inputs of said motor;
   d. power supply means connected between T3 and the other of L1 and L2 for supplying power to said voltage monitoring circuit means and for supplying a reference voltage;
   e. control means responsive to said voltage monitoring circuit means for opening said normally closed switch to disconnect said start capacitor when said voltage monitoring circuit means detects a voltage indicative of normal motor operating speed; and
   f. phase sequencing detector means for detecting a correct sequence of phase voltages between each of said three inputs to determine that said motor is running in the correct direction, said phase sequencing detector means disabling said voltage monitoring circuit means in the event said correct sequence is not detected.

10. A circuit as in claim 9, wherein said voltage monitoring circuit means comprises:
    a. a first voltage divider extending between T3 and L1 or L2; and
    b. a first comparator which compares a voltage across a portion of said voltage divider with said reference voltage, said first comparator causing said control means to open said normally closed switch when said voltage divider voltage exceeds said reference voltage.

11. A circuit as in claim 10, wherein said voltage monitoring circuit means further comprises:
    a. a filter for filtering out voltage spikes which occur during motor start-up such that such spikes do not prematurely cause said first comparator to cause said control means to open said normally closed switch in response to such voltage spikes.

12. A circuit as in claim 9, said normally closed switch comprising a relay with a normally closed relay contact, said circuit further comprising:
    a. a feedback loop connected across said relay to generate a hysterisis effect in said relay such that the effective voltage operating range of said circuit is enhanced.

13. A circuit as in claim 9, wherein:
    a. said normally closed switch comprises a normally closed relay contact controlled by a relay coil; and
    b. said control means includes a switch for selectively supplying current to said relay coil, said first comparator causing said switch to close to supply current to said relay coil when said first voltage divider voltage is greater than said reference voltage.

14. A circuit as in claim 13, said circuit further comprising:
    a. a feedback loop connected across said relay coil to generate a hysterisis effect in said relay coil such that the effective voltage operating range of said circuit is enhanced.

15. A circuit as in claim 10, wherein said phase sequencing detector means comprises:
    a. a second voltage divider extending between T3 and L1 or L2; and
    b. a second comparator which compares a voltage across a portion of said voltage divider with a reference voltage, said second comparator disabling said voltage monitoring circuit means when said second voltage divider voltage is greater than said reference voltage.

16. A circuit as in claim 15, wherein said phase sequencing detector means further comprises:
    a. a filter for filtering out voltage spikes which occur during motor start-up such that such spikes do not prematurely cause said second comparator to disable said voltage monitoring circuit.

17. A three phase motor conversion and monitoring circuit for converting a three phase motor to operate from a single phase power source, two inputs of said motor being connected to individual power line leads L1 and L2 and a third motor input being connected to a floating reference lead T3, said circuit comprising:

a. a start capacitor;

b. a normally closed switch selectively connecting said start capacitor across two inputs of said motor;

c. voltage monitoring circuit means connected between either L1 or L2 and T3 for monitoring a voltage across two inputs of said motor to detect a voltage indicative of normal motor operating speed;

d. phase sequencing detector means for detecting a correct sequence of phase voltages between each of said three inputs to determine that said motor is running in the correct direction;

e. power supply means connected between T3 and the other of L1 and L2 for supplying power to said voltage monitoring circuit means and said phase sequencing detector means; and f. control means responsive to said power supply means, said voltage monitoring circuit means and said phase sequencing detector means for controlling said switch to disconnect said start capacitor when normal motor operating speed and direction is indicated.

18. A circuit as in claim 17, wherein said voltage monitoring circuit means comprises:

a. a first voltage divider extending between T3 and L1 or L2; and b. a first comparator which compares a voltage across a portion of said first voltage divider with said reference voltage, said first comparator causing said control means to open said switch when said first voltage divider voltage exceeds said reference voltage.

19. A circuit as in claim 18, wherein said voltage monitoring circuit means further comprises:

a. a filter for filtering out voltage spikes which occur during motor start-up such that such spikes do not prematurely cause said first comparator to cause said control means to open said normally closed switch in response to such voltage spikes.

20. A circuit as in claim 18, wherein:

a. said normally closed switch comprises a normally closed relay contact controlled by a relay coil; and said control means includes a switch for selectively supplying current to said relay coil, said first comparator causing said switch to close to supply current to said relay coil when said first voltage divider voltage is greater than said reference voltage.

21. A circuit as in claim 20, said circuit further comprising:

a. a feedback loop connected across said relay coil to generate a hysterisis effect in said relay such that the effective voltage operating range of said circuit is enhanced.

22. A circuit as in claim 18, wherein said phase sequencing detector means comprises:

a. a second voltage divider extending between T3 and L1 or L2; and b. a second comparator which compares a voltage across a portion of said second voltage divider with a reference voltage, said comparator means disabling said voltage monitoring circuit means when said second voltage divider voltage is greater than said reference voltage.

23. A circuit as in claim 22, wherein said phase sequencing detector means further comprises:

a. a filter for filtering out voltage spikes which occur during motor start-up such that such spikes do not prematurely cause said second comparator to disable said voltage monitoring circuit.

* * * * *